United States Patent [19]

Hayashi et al.

[11] Patent Number: 5,698,315
[45] Date of Patent: Dec. 16, 1997

[54] ELECTRICALLY-CONDUCTIVE COLORLESS TRANSPARENT BARIUM SULFATE FILLER

[75] Inventors: Takao Hayashi; Norihiro Sato, both of Yamaguchi; Nobuyoshi Kasahara; Katsuhiko Yoshimaru, both of Saitama; Kouichi Kawaratani, Yamaguchi, all of Japan

[73] Assignee: Mitsui Mining & Smelting Co., Ltd., Tokyo, Japan

[21] Appl. No.: 652,409

[22] Filed: May 23, 1996

Related U.S. Application Data

[63] Continuation-in-part of Ser. No. 116,611, Sep. 7, 1993, abandoned.

[30] Foreign Application Priority Data

Sep. 7, 1992 [JP] Japan ................... 4-265396
Apr. 14, 1993 [JP] Japan ................... 5-109773

[51] Int. Cl.$^6$ ............... B32B 5/16; C01F 11/46; H01B 1/08
[52] U.S. Cl. ............. 428/336; 252/518; 428/328; 428/330; 428/403; 428/404
[58] Field of Search ................... 428/328, 330, 428/336, 402, 403, 404; 252/518

[56] References Cited

U.S. PATENT DOCUMENTS

| | | | |
|---|---|---|---|
| 4,389,451 | 6/1983 | Fujioka et al. | 428/212 |
| 4,613,539 | 9/1986 | Hormadaly | 428/210 |

FOREIGN PATENT DOCUMENTS

56-157438  5/1980  Japan.

*Primary Examiner*—D. S. Nakarani
*Attorney, Agent, or Firm*—Sughrue, Mion, Zinn, Macpeak & Seas, PLLC

[57] ABSTRACT

A electrically-conductive barium sulfate filler and a method for preparing same are herein disclosed and it comprises a particulate core material composed of barium sulfate provided thereon with a coating film of tin dioxide which may be optionally doped with niobium or tentalum, the bare core material free of coating film having a specific surface area ranging from 0.1 to 150 m$^2$/g and the film having a thickness ranging from 2 to 80 nm.

6 Claims, No Drawings

ELECTRICALLY-CONDUCTIVE COLORLESS TRANSPARENT BARIUM SULFATE FILLER

This is a Continuation of application Ser. No. 08/116,611 filed Sep. 7, 1993, now abandoned.

BACKGROUND OF THE INVENTION (a) Field of the Invention

The present invention relates to a electrically-conductive barium sulfate filler and a method for preparing the same and more particularly to a electrically-conductive barium sulfate filler which is excellent in whiteness, non-poisonous and inexpensive, and has electrically-conductivity stable to any temperature change and is highly dispersible in plastics, rubbers, resins, paints and varnishes and fibers as well as a method for preparing the filler.

(b) Description of the Prior Art

Electrical insulating properties of plastics become causes of various technical problems in several applications thereof. The electrical insulating properties of plastics becom obstacles in, for instance, shielding electric parts from a relatively high electromagnetic field, for instance, observed when a computer housing is employed or in discharging of electrically-charged parts. The electrical insulating properties of plastics become causes of various problems encountered when storing or conveying high performance explosives or IC parts, preparing carpets which are subjected to an antistatic treatment or rubber products for medical use, or preparing electrically-conductive adhesives for metals.

It has been known that a polymer can be converted into a electrically-conductive material through incorporation of electrically-conductive particles. As fine substances capable of imparting electrically-conductivity to, for instance, plastics and paints and varnishes through incorporation thereof into these substances, there have been known, for instance, metal particles or carbon black particles; particles of semi-conductive oxides such as zinc oxide and iodides (e.g., copper iodide); tin oxide powder doped with, for instance, antimony; zinc oxide powder doped with, for instance, aluminum or powder of, for instance, titanium dioxide and aluminum oxide coated with tin oxide; and fibrous materials such as glass fibers, alkali metal titanate fibers and titanium oxide fibers coated with tin oxide.

If metal particles or carbon black particles are used as electrically-conductive particles, polymers are blackened by the addition of such additives. This is often undesirable in most of applications thereof. For instance, the use of zinc oxide particles suffers from a problem that the resulting polymer shows reduced chemical resistance and fluctuation of in the electrically-conductivity due to temperature and/or humidity changes. A polymer comprising copper iodide has very low chemical stability and this substantially limits the application of the polymer. Moreover, antimony-doped tin oxide powder is excellent in a electrically-conductivity-imparting ability, but the resulting polymer has a blue-black color tone due to the doped antimony and suffers from a problem of low whiteness. Further antimony suffers from a problem of toxicity. Thus, the polymers comprising antimony-doped tin oxide powder are substantially limited in the application thereof.

Japanese Un-examined Patent Publication No. Sho 56-157438 discloses a method for preparing a powdery mixture which can be incorporated into plastics to impart electrically-conductivity thereto. This method comprises adding a solution comprising $SnCl_4$ and $SbCl_3$ to a heated aqueous suspension of barium sulfate. In this method, the precipitation reaction is carried out in an acidic environment and accordingly, the resulting powdery mixture comprises $SnO_2$ powder and barium sulfate powder. However, plastics to which such a powdery mixture is added have electrically-conductivities unstable to temperature changes. In addition, the powdery mixture has relatively low dispersibility in plastics and, therefore, it is difficult to uniformly disperse the powdery mixture in the plastics.

As has been discussed above in detail, the conventional electrically-conductive barium sulfate fillers are limited in the application due to insufficiency in at least one of whiteness, transparency, nontoxicity, cost, electrically-conductivity, dispersibility and the like or they are insufficient in at least one of whiteness, transparency, cost, electrically-conductivity, dispersibility and the like.

SUMMARY OF THE INVENTION

Under the aforementioned circumstances, the inventors of this invention have conducted various studies to provide a electrically-conductive barium sulfate filler which can eliminate the foregoing disadvantages, have found out that it is effective to limit the specific surface area of starting barium sulfate and the thickness of a film which covers the barium sulfate to specific ranges respectively and consequently have completed the present invention.

Accordingly, an object of the present invention is to provide a electrically-conductive barium sulfate filler which exhibits excellent properties such as those listed below:

(1) As the electrically-conductive barium sulfate filler per se has excellent colorless transparency, base materials such as paper, plastics, rubbers, resins, paints and fibers and varnishes do not get colored by the addition of the filler and maintain the transparency or whiteness thereof. Accordingly, any desired color tone can be imparted to the base materials through addition of coloring agents;

(2) The filler is substantially free of toxic substances such as antimony;

(3) It can be prepared at a low cost in a case where a dopant is not used;

(4) It has a electrically-conductivity stable to temperature changes and to humidity changes in a case where a dopant is used.;

(5) It is highly dispersible in plastics and resins; and (6) It does not show any loss of electrically-conductivity due to peeling off of a electrically-conductive film which covers the surface of the electrically-conductive barium sulfate filler when the filler is incorporated into base materials such as paper, plastics, rubbers, resins paints and varnishes and fibers.

Another object of the present invention is to provide a method for preparing the foregoing electrically-conductive barium sulfate filler, which allows the production thereof by a simple technical means at a high reaction rate and at a low cost.

The present invention thus relates to a electrically-conductive barium sulfate filler which comprises a particulate core material composed of barium sulfate provided thereon with a coating film of tin dioxide, the bare core material free of coating film having a specific surface area ranging from 0.1 to 150 $m^2/g$ and the film having a thickness ranging from 2 to 80 nm. The present invention also relates to a electrically-conductive barium sulfate filler wherein the electrically-conductive barium sulfate filler according to claim 1 comprising wherein the coating film of tin dioxide is doped with niobium or tantalum and the amount of the dopant expressed in terms of the amount of Nb or Ta ranges from 0.1 to 10% by weight on the basis of the weight of the tin dioxide.

Accordingly to another aspect of the present invention, there is provided a method for preparing the foregoing electrically-conductive barium sulfate filler which comprises the steps of mixing a suspension containing barium sulfate particles having a specific surface area ranging from 0.1 to 150 $m^2/g$ in a concentration ranging from 10 to 1000 g/l, preferably 50 to 500 g/l with an alkaline solution containing a compound of tetravalent tin in a concentration ranging from 1 to 95% by weight; adjusting the pH of the mixture to 11 to 14, preferably 11 to 12 to give a mixed solution; then adjusting the pH of the mixture to 1 to 5, preferably 2 to 3 by addition of an acid to thus give precipitates; isolating the precipitates through solid-liquid separation; drying the precipitates; and then calcining the precipitates in an inert atmosphere or a reducing atmosphere. According to further aspect of the present invention, there is provided a method for preparing a electrically-conductive barium sulfate filler as set forth in claim 5 comprising the steps of (a) mixing a suspension containing barium sulfate particles having a specific surface area ranging from 0.1 to 150 $m^2/g$ in a concentration ranging from 10 to 1000 g/l with an alkaline solution containing a compound of tetravalent tin in a concentration ranging from 1 to 95% by weight; (h) adjusting the pH of the mixture to 11 to 14 to give a mixed solution; (c) adding an acid solution containing a five-valent niobium compound or tantalum compound in an amount expressed in terms of the amount of Nb or Ta ranging from 0.1 to 10% by weight on the basis of the weight of the tin dioxide; (d) adjusting the pH of the mixture to 1 to 5 by addition of an acid to thus give precipitates; (e) isolating the precipitates through solid-liquid separation; (f) drying the precipitates; and then (g) calcining the precipitates in an inert atmosphere or a reducing atmosphere.

DESCRIPTION OF THE PREFERRED EMBODIMENTS

The electrically-conductive barium sulfate filler and preparation method therefor according to the present invention will hereinafter be explained in more detail.

The electrically-conductive barium sulfate filler is covered with a coated film consisting of tin dioxide which may be optionally doped with niobium or tantalum and the latter has a thickness ranging from 2 to 80 nm and preferably 10 to 30 nm. If the thickness of the film is less than 2 nm, the barium sulfate particles coated with the film have insufficient electrically-conductivity and accordingly, satisfactory antistatic effect cannot be anticipated when such particles are incorporated into a resin matrix. In addition, the use of barium sulfate particles coated with the film having a thickness greater than 80 nm does not provide any effect substantially compensating an increased cost. If the thickness of the film ranges from 10 to 30 nm, a film of tin dioxide is relatively strongly adhered to barium sulfate particles and never peeled off from the barium sulfate particles even when the electrically-conductive barium sulfate filler is kneaded and mixed with a resin matrix.

The barium sulfate particles used in the electrically-conductive barium sulfate filler as a core material must have a specific surface area ranging from 0.1 to 150 $m^2/g$ in the uncoated bare state. If the uncoated bare barium sulfate particles have a specific surface area of less than 0.1 $m^2/g$, the electrically-conductive barium sulfate filler has a low electrically-conductivity per unit weight thereof and accordingly, satisfactory antistatic effect cannot be anticipated when such particles are incorporated into a resin matrix. On the other hand, if the specific surface area of the uncoated bare core material exceeds 150 $m^2/g$, a large amount of a coating substance consisting of tin dioxide which may be optionally doped with niobium or tantalum is required for the achievement of a desired electrically-conductivity and the resulting particles are not transparent and are tinged with blue. If barium sulfate particles have a specific surface area ranging from 0.1 to 3 $m^2/g$ or 12 to 150 $m^2/g$ in the uncoated bare state, the resulting electrically-conductive barium sulfate filler is transparent and suitable for use in paints and varnishes which are converted into electrically-conductive ones through the addition thereof. Moreover, the addition of the electrically-conductive barium sulfate filler does not adversely affect the hiding power of pigments additionally added. Barium sulfate used in the present invention may contain zinc sulfide as an contaminated impurity.

In the electrically-conductive barium sulfate filler according to the present invention, the amount of niobium or tantalum expressed in terms of the amount of Nb or Ta in the coating film ranges from 0.1 to 10% by weight, preferably 0.3 to 5% by weight on the basis of the weight of the tin dioxide. If the amount of niobium or tantalum is less than 0.1% by weight, the electrical conductivity of the resulting filler is insufficient, while if it exceed 10% by weight, the resulting filler is reduced in whiteness.

In the method for preparing the electrically-conductive barium sulfate filler, if the concentration of barium sulfate in the barium sulfate suspension is less than 10 g/l, the productivity is impaired, while if it exceeds 1000 g/l, the suspension comprises free tin dioxide and this makes the formation of a uniform film of tin dioxide difficult. Examples of tetravalent tin compounds usable in the present invention are stannic chloride and sodium stannate etc. Examples of pentavalent niobium compounds or tantalum compounds usable in the present invention are soluble compounds such as chloride or fluoride.

The method according to the present invention is advantageous in that barium sulfate particles are completely coated with tin dioxide films which may be optionally doped with niobium or tantalum, these barium sulfate particles can easily be coated with the film of tin dioxide within a short time period and the resulting electrically-conductive particles are highly dispersible in plastics.

In the electrically-conductive barium sulfate filler according to the present invention, particulate barium sulfate is used as a core material and the surface thereof is covered with a film of tin dioxide per se or a film of tin dioxide doped with niobium or tantlum. Therefore, the filler of the invention is cheaper than the electrically-conductive barium sulfate filler coated with the film of tin dioxide doped with antimony and does not have blue-black color tone due to the doped antimony. Accordingly, the filler of the invention is excellent in whiteness. Moreover, since the thin film of tin dioxide is transparent and barium sulfate as a core material has a low refractive index, the use of the electrically-conductive barium sulfate filler hardly impairs the transparency of a matrix substance such as paints and varnishes, resins or plastics and never causes coloration thereof. This permits the addition of a coloring agent together with the electrically-conductive barium sulfate filler to impart any desired color tone to the matrix. In addition, the electrically-conductive barium sulfate filler of the invention is not toxic, and has a electrically-conductivity stable to temperature changes and humidity changes and is highly dispersible in plastics.

The electrically-conductive barium sulfate filler according to the present invention can be incorporated into various substances such as paper, plastics, rubbers, resins, paints and varnishes and fibers to impart electrical electrically-conductivity and accordingly, can be used in various fields such as means for protecting precision electronic machinery and tools from various troubles due to electrostatic discharges; means for electrostatic disaster prevention; housings for dustproof; construction materials; fibers; and parts of machinery. In addition, the electrically-conductive barium sulfate filler according to the present invention may likewise be used in the preparation of duplicating machine-related parts and substances such as electrically-conductive rollers, light-sensitive drums and toners as a charge-control agent and in the preparation of cells as an electrode-modification materials.

The present invention will hereinafter be explained in more detail with reference to the following working Examples, but the present invention is by no means limited to these specific Examples.

EXAMPLE 1

An amount of 100 g of barium sulfate particles having a specific surface area of 10 $m^2/g$ was dispersed in 1500 ml of water to give a slurry, then the slurry containing the dispersed barium sulfate particles was heated up to 75° C. and a 25% aqueous solution of sodium hydroxide was dropwise added to the slurry so that the pH value thereof was controlled to a level on the order of about 12. Thereafter an aqueous solution of 81.09 g of sodium stannate (having an $Na_2SnO_3$ content of 96%) in 500 ml of water was added to the slurry, then the mixture was stirred for 30 minutes and a 20% aqueous sulfuric acid solution was added to the slurry over 90 minutes so that the pH value thereof was adjusted to 2.5. The slurry was ripened for 3 hours while maintaining the pH and the temperature thereof at 2.5 and 75° C. respectively, followed by filtration, washing, drying and calcination at 300° C. for 2 hours in an argon atmosphere using a horizontal tubular furnace to thus give a electrically-conductive barium sulfate filler according to the present invention. The resulting electrically-conductive barium sulfate filler has a tin content (as expressed in terms of $SnO_2$ content) of 30.5% by weight. The specific resistivity and the color difference of the resulting electrically-conductive barium sulfate filler are listed in the following Table 1. In this respect, the electrically-conductive barium sulfate filler was pressure-molded, at a pressure of 2 ton/$cm^2$, into a specimen and then the specific resistance value thereof was determined using a low resistance-determining device (Loresta, available from Mitsubishi Petrochemical Co., Ltd.) and the color difference thereof was determined on the basis of the values, L*, a* and b* which were measured by a color computer (SM-5 Type, available from Suga Testing Machine Co., Ltd.). Moreover, the electrically-conductive barium sulfate filler was examined by a scanning electron microscope and a transmission electron microscope and it was found that barium sulfate particles each was uniformly covered with a tin dioxide film and that any free tin dioxide was not present at all.

EXAMPLES 2 to 7

The same procedures used in Example 1 were repeated except for using calcination furnaces, calcination temperatures, calcination times and calcination atmospheres listed in Table 1 to give electrically-conductive barium sulfate fillers according to the present invention. The specific resistance values and the color differences of these electrically-conductive barium sulfate fillers thus prepared were likewise determined in the same manner detailed in Example 1 and found to be those listed in the following Table 1. Moreover, these electrically-conductive barium sulfate fillers were likewise examined by a scanning electron microscope and a transmission electron microscope and it was found that the barium sulfate particles constituting each sample of the fillers were uniformly covered with tin dioxide films and that any free tin dioxide was not present at all as in the case of Example 1.

TABLE 1

| Ex. No. | Furnace Used | Calcination Conditions | | | Specific Resistivity ($\Omega \cdot cm$) | Color Difference | | |
|---|---|---|---|---|---|---|---|---|
| | | Calcination Temp. (°C.) | Calcination Time (min) | Calcination Atmosphere | | L* | a* | b* |
| 1 | horizontal tubular furnace | 300 | 120 | Ar | 2100 | 95.48 | −1.1 | 4.1 |
| | horizontal tubular furnace | 400 | 120 | Ar | 3200 | 95.08 | −1.2 | 3.8 |
| 3 | horizontal tubular furnace | 400 | 180 | Ar | 1800 | 91.18 | −1.1 | 1.9 |
| 4 | horizontal tubular furnace | 500 | 120 | Ar | 1100 | 93.18 | −1.3 | 4.3 |
| 5 | vertical Furnace | 400 | 120 | $N_2$ | 220 | 93.46 | −1.0 | 3.2 |
| 6 | vertical Furnace | 450 | 120 | $N_2$ | 270 | 90.09 | −0.7 | 1.7 |
| 7 | vertical Furnace | 450 | 120 | $N_2 + H_2$ | 120 | 84.40 | −0.5 | 5.4 |

(the atmosphere used in Example 7 comprised 95 vol % $N_2$ and 5 vol % $H_2$.)

EXAMPLE 8

An amount of 100 g of barium sulfate particles having a particle size of 0.1 μm and a specific surface area of 20 $m^2/g$ was dispersed in 1500 ml of water to give a slurry, then the slurry containing the dispersed barium sulfate particles was heated up to 75° C. and a 25% aqueous solution of sodium hydroxide was dropwise added to the slurry so that the pH value thereof was controlled to a level on the order of about 12. Thereafter an aqueous solution of 196.9 g of sodium stannate (having an Sn content of 40%) in 500 ml of water was added to the slurry, the temperature of the liquid was adjusted to 75° C., then the mixture was stirred for 30 minutes and a 20% aqueous sulfuric acid solution in which 1.47 g of niobium pentachloride (0.5% by weight expressed in terms of the amount of Nb on the basis of the weight of the tin dioxide) was added to the slurry over 90 minutes so that the pH value thereof was adjusted to 2.5. The slurry was ripened for 3 hours while maintaining the pH and the temperature thereof at 2.5 and 75° C. respectively, followed by filtration, washing, drying and calcination at 450° C. for 2 hours in a nitrogen atmosphere to thus give a electrically-conductive barium sulfate filler according to the present invention. The resulting electrically-conductive barium sulfate filler has a tin content (as expressed in terms of $SnO_2$ content) of 49.8% by weight. The specific resistivity and the color difference of the resulting electrically-conductive barium sulfate filler are listed in the following Table 2. In this respect, the electrically-conductive barium sulfate filler was pressure-molded, at a pressure of 2 ton/$cm^2$, into a specimen and then the specific resistance value thereof was determined using a low resistance-determining device (Loresta, available from Mitsubishi Petrochemical Co., Ltd.) and the color difference thereof was determined on the basis of the values, L *, a * and b * which were measured by a color computer (SM-5 Type, available from Suga Testing Machine Co., Ltd.).

EXAMPLES 9 to 17

The same procedures used in Example 1 were repeated except for using particle size of barium sulfate, coverage of tin dioxide, kinds and amounts of niobium compound or tantalum compound used (% by weight expressed in terms of the amount of Nb or Ta on the basis of the tin dioxide), calcination temperatures and calcination atmospheres listed in Table 1 to give electrically-conductive barium sulfate fillers according to the present invention. The specific resistance values and the color differences of these electrically-conductive barium sulfate fillers thus prepared were likewise determined in the same manner detailed in Example 1 and found to be those listed in the following Table 2.

The results were shown in the following Table 3.

TABLE 3

| Condition | Sample | Initial | After 1 day | After 3 days | After 5 days | After 10 days | After 20 days |
| --- | --- | --- | --- | --- | --- | --- | --- |
| 80° C. | Example 8 | 40 | 70 | 100 | 100 | 100 | 100 |
| 90% RH | Example 8 | 240 | 300 | 400 | 400 | 400 | 400 |
|  | Non Nb | 70 | 800 | 900 | 1500 | 2000 | 5000 |
| 100° C. | Example 9 | 40 | 50 | 200 | 300 | 300 | 300 |
|  | Example 9 | 240 | 300 | 500 | 500 | 500 | 500 |
|  | Non Nb | 70 | 700 | 2000 | 20000 | 40000 | 40000 |

The electrically-conductive barium sulfate fillers according to the present invention exhibits the excellent effects such as those listed below:

(1) The electrically-conductive barium sulfate filler per se has excellent whiteness, base materials such as paper, plastics, rubbers, resins and paints and varnishes do not get colored by the addition of the filler and maintain the transparency or whiteness thereof and accordingly, any desired color tone can be imparted to the base materials through addition of coloring agents;

(2) The filler is substantially free of toxic substances such as antimony;

(3) It can be prepared at a low cost;

(4) It has a electrically-conductivity stable to temperature changes;

(5) It is highly dispersible in plastics; and (6) It does not show any loss of electrically-conductivity due to peeling off of a electrically-conductive film which covers the surface of the electrically-conductive barium sulfate filler when the filler is incorporated into base materials such as paper, plastics, rubbers, resins and paints and varnishes.

TABLE 2

| | | | | | Calcination Condition | | |
| --- | --- | --- | --- | --- | --- | --- | --- |
| | Particle size of | Coverage of | Compound | | Calcination | | Specific |
| Ex. No. | barium sulfate, μm | $SnO_2$, % by weight | kind | amount, % by weight | temperative, °C. | Calcination atmosphere | Resistivity Ω·cm | whiteness L* |
| 8 | 0.1 | 49.8 | $NbCl_6$ | 0.5 | 450 | $N_2$ | 40 | 87 |
| 9 | 0.1 | 49.8 | $TaCl_6$ | 0.5 | 450 | $N_2$ | 240 | 89 |
| 10 | 0.1 | 69.7 | $H_2NbF_7$ | 0.5 | 450 | $N_2$ | 10 | 83 |
| 11 | 0.1 | 79.1 | $H_2NbF_7$ | 1.0 | 400 | $N_2$ | 4 | 78 |
| 12 | 0.1 | 49.0 | $NbCl_5$ | 3.0 | 500 | $N_2$ | 30 | 85 |
| 13 | 0.3 | 30.0 | $NbCl_5$ | 0.5 | 550 | $N_2$ | 100 | 90 |
| 14 | 0.3 | 29.8 | $NbCl_5$ | 1.0 | 400 | $N_2$ | 150 | 92 |
| 15 | 0.3 | 29.8 | $TaCl_5$ | 1.0 | 300 | $N_2 + H_2$ | 100 | 87 |
| 16 | 0.7 | 20.0 | $NbCl_5$ | 1.0 | 300 | $N_2 + H_2$ | 50 | 89 |
| 17 | 0.7 | 30.0 | $NbCl_5$ | 1.0 | 450 | $N_2$ | 40 | 94 |

(the atmosphere used in Examples 15 and 16 comprised 95 vol % $N_2$ and 5 vol % $H_2$)

EXAMPLE 18

Electically-conductive barium salfates fillers obtained in Examples 8 and 9 and electrically-conductive barium sulfate filler obtained in the same manner used in Example 8 except that niobium compound is not added (the filler is described as non Nb in the following Table 3) were standed under constant temperature and humidity (80° C., 90% RH) or 100° C. and time variabilities of specific resistivity (Ω·cm) were determined.

We claim:

1. An electrically-conductive colorless transparent barium sulfate filler consisting essentially of a particulate core of barium sulfate uniformly covered thereon with a coating film consisting of tin dioxide, the particulate core having a specific surface area ranging from 0.1 to 3 $m^2$/g or 12 to 150 $m^2$/g and the coating film having a thickness ranging from 2 to 80 nm, said barium sulfate filler having a specific resistivity from 4 to 270 Ω·cm..

2. The electrically-conductive barium sulfate filler according to claim 1 wherein the coating film of tin dioxide has a thickness ranging from 10 to 30 nm.

3. The electrically-conductive barium sulfate filler according to claim 1 which is obtained by a method comprising the steps of (a) mixing a suspension containing barium sulfate particles having a specific surface ranging from 0.1 to 150 m$^2$/g in a concentration ranging from 10 to 1000 g/l with an alkaline solution containing a compound of tetravalent tin in a concentration ranging from 1 to 95% by weight; (b) adjusting the pH of the mixture to 11 to 14 to give a mixed solution; (c) adjusting the pH of the mixture to 1 to 5 by addition of an acid to thus give precipitates; (d) isolating the precipitates through solid-liquid separation; (e) drying the precipitates; and then(f) calcining the precipitates in an inert atmosphere or a reducing atmosphere.

4. An electrically-conductive colorless transparent barium sulfate filler consisting essentially of a particulate core of barium sulfate uniformly covered thereon with a coating film consisting of tin dioxide doped with niobium or tantalum and the amount of the dopant expressed in terms of the amount of niobium or tantalum ranges from 0.1 to 10% by weight on the basis of the weight of the tin dioxide, wherein the particulate core having a specific surface area ranging from 0.1 to 3 m$^2$/g or 12 to 150 m$^2$/g and the coating film having a thickness ranging from 2 to 80 nm, said barium sulfate filler having a specific resistivity from 4 to 270 Ω·cm.

5. The electrically-conductive barium sulfate filler according to claim 4 wherein the coating film has a thickness ranging from 10 to 30 nm.

6. The electrically-conductive barium sulfate filler according to claim 4 which is obtained by a method comprising the steps of (a) mixing a suspension containing barium sulfate particles having a specific surface ranging from 0.1 to 150 m$^2$/g in concentration ranging from 10 to 1000 g/l with an alkaline solution containing a compound of tetravalent tin in a concentration ranging from 1 to 95% by weight; (b) adjusting the pH of the mixture to 11 to 14 to give a mixed solution; (c) adding an acid solution containing a five-valent niobium compound or tantalum compound in an amount expressed in terms of the amount of Nb or Ta ranging from 0.1 to 10% by weight on the basis of the weight of the tin dioxide; (d) adjusting the pH of the mixture to 1 to 5 by addition of an acid to thus give precipitates; (e) isolating the precipitates through solid liquid separation; (f) drying the precipitates; and then (g) calcining the precipitates in an inert atmosphere or a reducing atmosphere.

* * * * *